United States Patent
Brunner et al.

(10) Patent No.: US 8,255,826 B2
(45) Date of Patent: Aug. 28, 2012

(54) METHOD AND APPARATUS FOR RESIZING BUFFERED WINDOWS

(75) Inventors: Ralph Brunner, Santa Clara, CA (US); Peter Graffagnino, San Francisco, CA (US); Andrew Barnes, Foster City, CA (US)

(73) Assignee: Apple Inc., Cupertino, CA (US)

( * ) Notice: Subject to any disclaimer, the term of this patent is extended or adjusted under 35 U.S.C. 154(b) by 1051 days.

(21) Appl. No.: 11/985,380

(22) Filed: Nov. 14, 2007

(65) Prior Publication Data

US 2008/0072173 A1 Mar. 20, 2008

Related U.S. Application Data

(63) Continuation of application No. 10/193,404, filed on Jul. 10, 2002, now Pat. No. 7,302,648.

(51) Int. Cl.
*G06F 3/048* (2006.01)
*G06F 17/00* (2006.01)

(52) U.S. Cl. ......... 715/788; 715/801; 715/806; 715/798

(58) Field of Classification Search .......... 715/715–807; 345/694–699
See application file for complete search history.

(56) References Cited

U.S. PATENT DOCUMENTS

| | | | |
|---|---|---|---|
| 4,890,257 A | 12/1989 | Anthias et al. | 715/807 |
| 5,163,046 A | 11/1992 | Hahne et al. | 370/237 |
| 5,297,251 A | 3/1994 | Alcorn et al. | 715/803 |
| 5,434,964 A | 7/1995 | Moss et al. | 715/788 |
| 5,463,422 A | 10/1995 | Simpson et al. | 348/390.1 |
| 5,522,025 A | 5/1996 | Rosenstein | 715/807 |
| 5,721,849 A | 2/1998 | Amro | 715/802 |
| 5,742,788 A | 4/1998 | Priem et al. | 711/110 |
| 5,751,283 A | 5/1998 | Smith | 715/798 |
| 5,883,634 A | 3/1999 | Narayanaswami | 345/628 |
| 5,936,672 A | 8/1999 | Ahnn | 375/240.17 |
| 5,956,032 A * | 9/1999 | Argiolas | 715/798 |
| 6,005,572 A | 12/1999 | Kurihara | 345/531 |
| 6,023,275 A * | 2/2000 | Horvitz et al. | 715/700 |
| 6,081,818 A | 6/2000 | Shieh | 715/539 |
| 6,373,526 B1 | 4/2002 | Kessler et al. | 348/468 |
| 6,587,112 B1 | 7/2003 | Goeltzenleuchter et al. | 345/532 |
| 6,628,291 B1 | 9/2003 | Edrington et al. | 345/545 |
| 6,892,359 B1 | 5/2005 | Nason et al. | 715/788 |

(Continued)

OTHER PUBLICATIONS

K. J. Bricknell Macintosh C Carbon: A Hobbyist's Guide to Programming the Macintosh in C version 1.0, 2001.

(Continued)

*Primary Examiner* — Tadeese Hailu
(74) *Attorney, Agent, or Firm* — Blakely, Sokoloff, Taylor & Zafman LLP (57) ABSTRACT

Methods and apparatuses for resizing buffered windows. In one aspect of the invention, a method to resize a buffered window on a data processing system includes: determining an estimated size for a window which has a first pixel image of a first size buffered in a first window buffer; allocating a second window buffer which is large enough to buffer the window in the estimated size; and buffering a second pixel image of the window in a second size in the second window buffer. In one example according to this aspect, a portion of a frame buffer is updated to the second pixel image to display the window in the second size. A portion of the second window buffer, storing the data that represents the second pixel image, is clipped to update the corresponding portion of the frame buffer.

25 Claims, 10 Drawing Sheets

U.S. PATENT DOCUMENTS

| | | | |
|---|---|---|---|
| 6,999,087 B2 | 2/2006 | Lavelle et al. | 345/543 |
| 2002/0186253 A1* | 12/2002 | Rodden et al. | 345/788 |
| 2002/0191027 A1* | 12/2002 | Morrow et al. | 345/788 |
| 2003/0107604 A1* | 6/2003 | Ording | 345/788 |
| 2004/0025112 A1 | 2/2004 | Chasen et al. | 715/501.1 |

OTHER PUBLICATIONS

Dwayne Towell, "Display Maintenance, A Pattern Language" Aug. 2, 1998.

* cited by examiner

Prior Art

Fig. 3

Prior Art

Fig. 4

Prior Art

METHOD AND APPARATUS FOR RESIZING BUFFERED WINDOWS

This application is a continuation application of U.S. patent application Ser. No. 10/193, 404 filed Jul. 10, 2002, now U.S. Pat. No. 7,302,648 entitled "METHOD AND APPARATUS FOR RESIZING BUFFERED WINDOWS".

FIELD OF THE INVENTION

The invention relates to graphical user interfaces, and more particularly to resizing buffered windows.

BACKGROUND OF THE INVENTION

In a graphical user interface on a computer system, a user can continuously resize a window until the window has a desirable size. For example, the user may drag a portion of the border of a window to change the size of the window continuously (e.g., press down and hold a button of a mouse when the cursor is on the portion of the border, and move the mouse while holding down the button). The change is finalized when the user releases the dragged portion of the border (e.g., release the button which was held down during dragging the border).

On some systems, when the size of the window is continuously changed, only a rectangle is displayed to indicate the current position of the border of the window. After the change is finalized, the window is redrawn to show the contents in the window of the new size.

On other systems, live resizing is performed. When the size of the window is continuously changed, the window is redrawn a number of times to show the contents in the window changing size as the window is continuously resized. Since live resizing shows the changing contents in the window as the window is continuously resized, live resizing provides better feedback to the user than merely redrawing the border of the window to show the changing size of the window.

In a buffered windows system, resizing a window is expensive because a new buffer is allocated and the new content for the window is filled into the allocated buffer. The problem is particularly problematic for live resizing, as any delay is directly experienced by the user.

Figure 1:
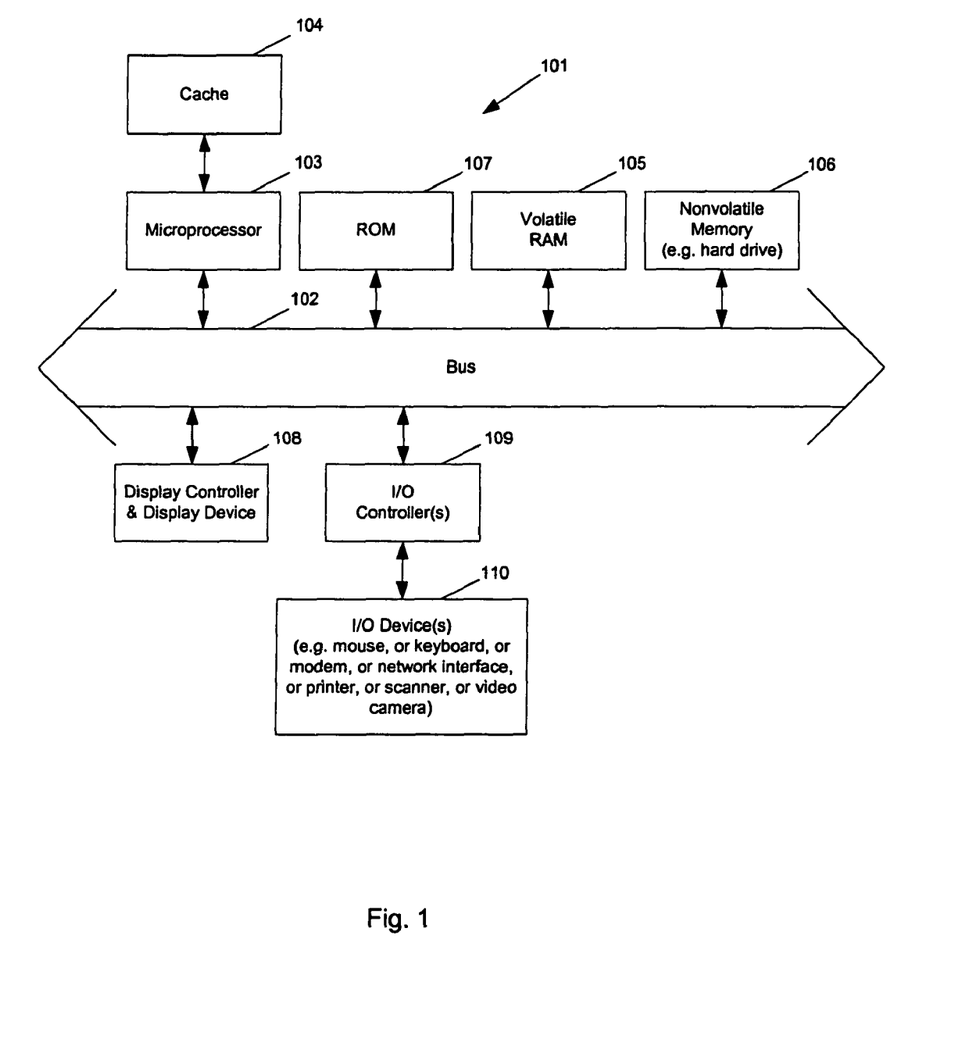
FIG. 1 shows a block diagram example of a data processing system which may be used with the present invention.
Figure 2:
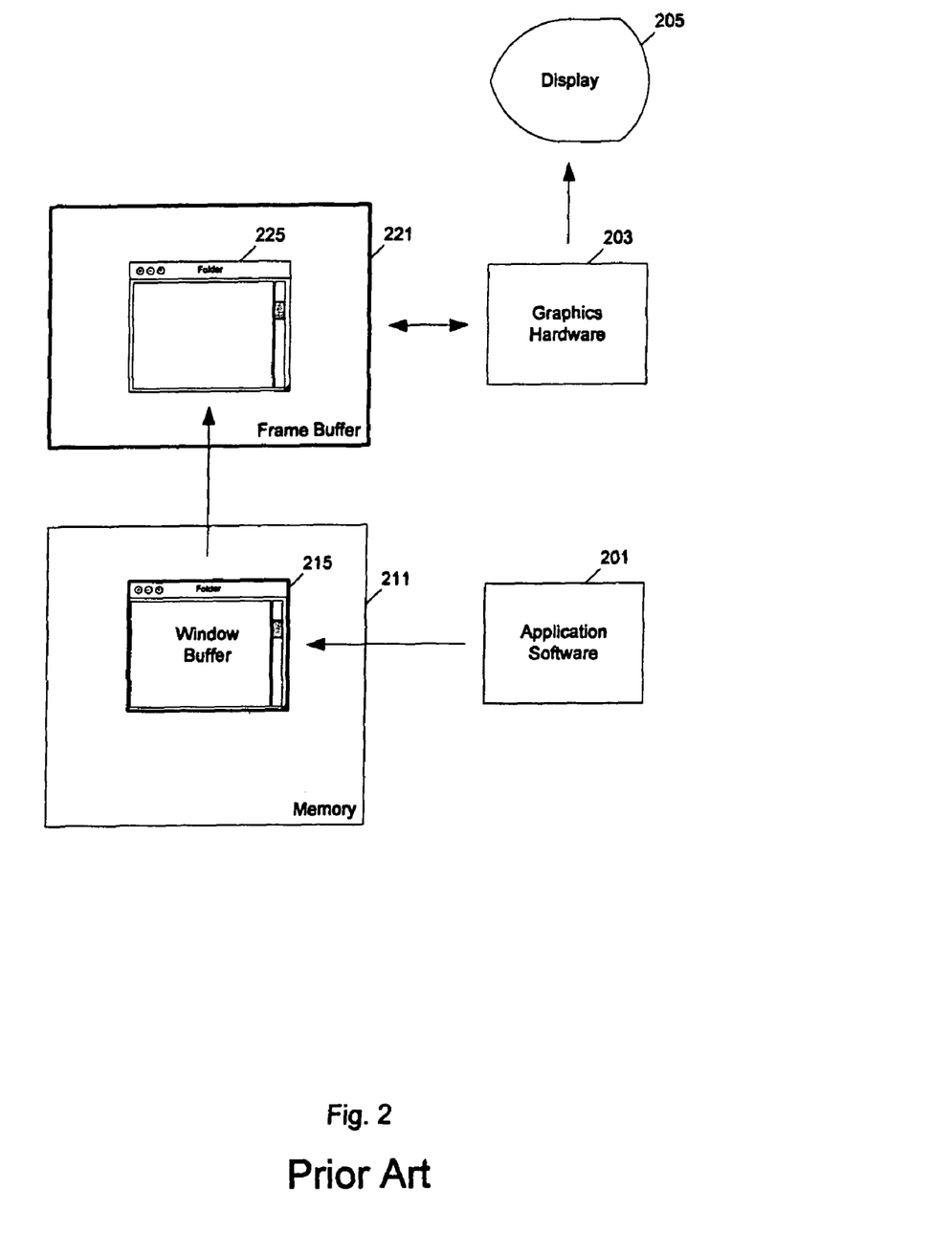
FIG. 2 illustrates a buffered window system.

FIG. 2 illustrates a buffered window system. In a buffered window system, applications draw contents in the window buffers; and the window system combines the images buffered in window buffers in a frame buffer to display the corresponding windows on the screen. For example, application software 201 draws contents in window buffer 215, which is typically allocated from system memory 211 (e.g., volatile RAM 105 in FIG. 1). When the size of the window is changed, a new window buffer is allocated to replace the old one in order to accommodate the window of the new size. Frame buffer 221 contains data for the screen image of the windows that are displayed on the screen of display device 205. When the window for application software 201 is moved on the screen, the content in the window is not changed; and the application software does not have to update window buffer 215. The window system copies the data in the window buffer to the correct position in frame buffer 221 to display the window in the new location on the screen. When the window is partially covered by other windows, a portion of data in window buffer 215 is copied onto the frame buffer to display the corresponding portion of the window that is visible. Frame buffer 221 is typically under control of graphics hardware 203 (e.g., graphics/video card) which controls the display of the windows on the screen of display device 205 using the data in the frame buffer.

Thus, in a buffered window system, operations for creating the contents in windows are separated from operations for composing a screen image from images of windows for different applications. Applications create (or update) images of the windows (contents for the windows) in window buffers; and the window system composes a screen image from images of the windows in the window buffers. The window buffers are independent from the frame buffer.

For illustration purpose, window buffers are illustrated in various Figures (FIGS. 3-10) at the locations in the frame buffers where the corresponding windows are displayed. It will be understood that such illustrations indicate that contents in the corresponding window buffers can be copied by the window system to the corresponding locations in the frame buffers to display the windows in these locations. It will be understood that these window buffers are not part of the frame buffers.

Figure 3:
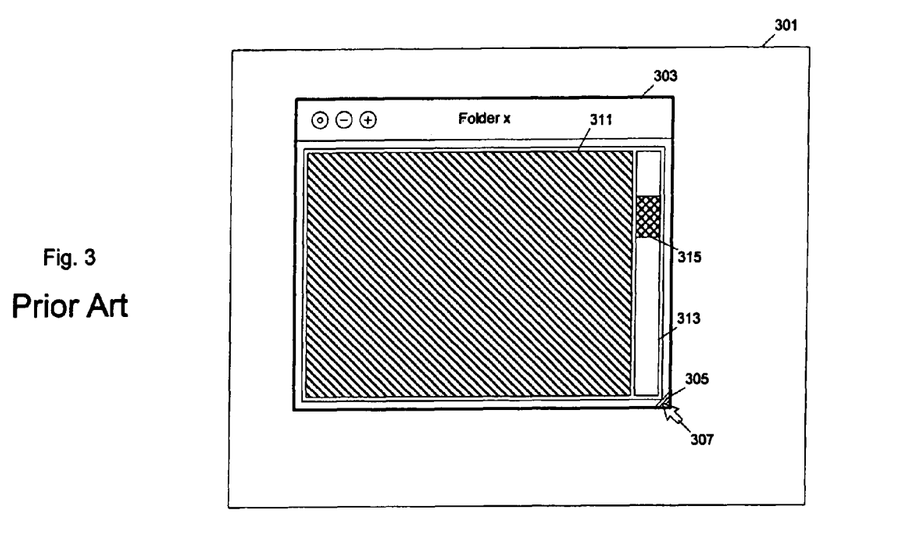
FIGS. 3-5 illustrate a prior art scenario of resizing a buffered window.
Figure 4:
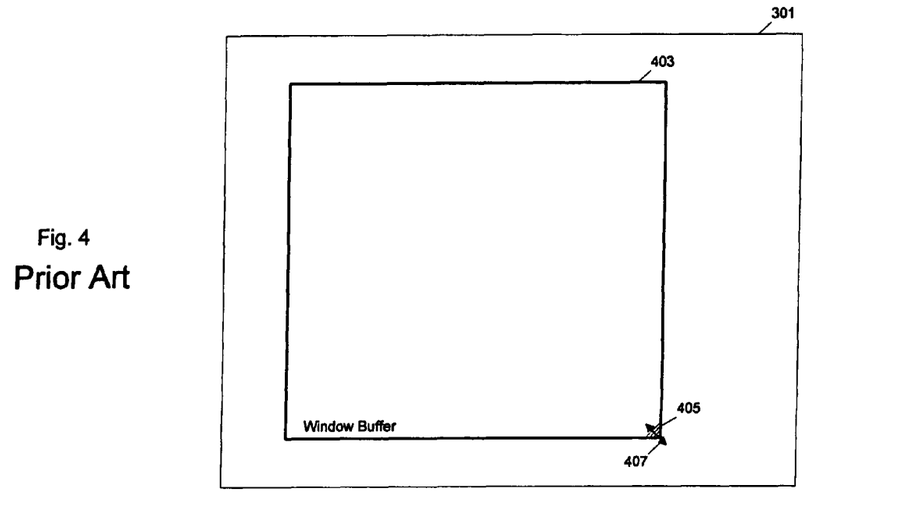
Figure 5:
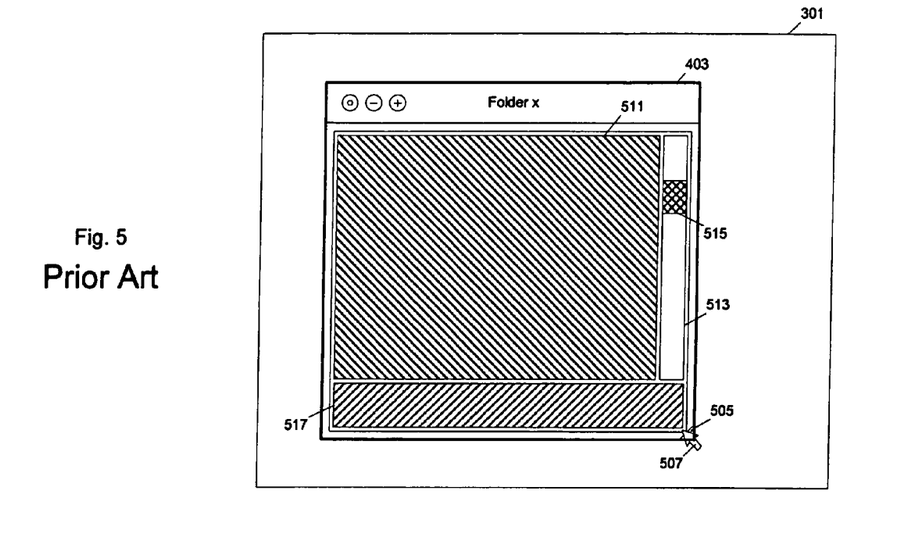

FIGS. 3-5 illustrate a prior art scenario of resizing a buffered window. In FIG. 3, window buffer 303 is shown on top of the portion of the frame buffer where the window is displayed before a resizing operation. When the user causes cursor 307 to drag grow box 305 (e.g., pressing and holding down a mouse button while the cursor is over the grow box and moving the mouse, or using keyboards or other input devices to provide similar inputs), the user starts to resize the window. Window 303 contains area 311 for displaying contents (e.g., list of folders or files in a folder) and scroll bar 313. The position and the size of thumb 315, with respect to the scroll bar, indicate the position and the size of the portion of the content visible in area 311 with respect to the entire content. When the window is resized to the size as indicated by the position of cursor 407 in FIG. 4, new window buffer 403 is allocated for the window according to the current size of the window. Then, the application updates new window buffer 403 to display the image of the window after resizing, as shown in FIG. 5. Since a portion of window is not changed after resizing, the data for that portion is copied from the old window buffer into the new window buffer; and the portion that is changed after resizing is redrawn by the application in the new window buffer. After the data is copied from the old window buffer to the new window buffer, the old window buffer is freed (or released) so that the memory allocated for the old window buffer can be used for other purposes. For example, the content in area 511 is not changed after resizing. Thus, the data in area 311 of window buffer 303 is copied into area 511 in window buffer 403. Then, window buffer 303 is freed. Area 517 is drawn, and scroll bar area 513 is redrawn, to display additional contents visible in area 517 and to indicate the updated position and size of the portion displayed in the visible area versus the entire content. When window buffer 403 is updated, the application can ask the window system to flush the contents in the window buffer to frame buffer 301 to actually display the image of the window.

SUMMARY OF THE INVENTION

Methods and apparatuses for resizing buffered windows in a graphical user interface are described here.

In one aspect of the invention, a method to resize a buffered window on a data processing system includes: determining an estimated size for a window which has a first pixel image of a first size buffered in a first window buffer; allocating a second window buffer which is large enough to buffer the window in the estimated size; and buffering a second pixel image of the window in a second size in the second window buffer. In one example according to this aspect, a portion of a frame buffer is updated to the second pixel image to display the window in the second size. The estimated size is determined in response to a user instructing the data processing system to resize the window, or in response to an activity of the data processing system (e.g., a computer program instruction initiated by a machine intended to resize the window, such as a system call from a software program or hardware sensor), or in response to other events or inputs. The estimated size may be a predetermined size (e.g., a size based on a viewable area of a display device, such as the size of a screen that is attached to the data processing system), or computed from one or more parameters (e.g., the size of a screen, the current size of the window, a predetermined increment for changing size). The second pixel image of the window in the second size is buffered in the second window after receiving a request to resize the window to the second size, or in response to a determination that the window is to be resized (e.g., when the window is live resized for animation). A portion of the second window buffer, storing the data that represents the second pixel image, is clipped to update the corresponding portion of the frame buffer. After the second pixel image is buffered in the second window buffer, the first window buffer is freed. Before the first window buffer is freed, data for a first portion of the window, which represents a pixel image for the first portion not changed when the window is resized from the first size to the second size, is copied from the first window buffer to the second window buffer.

In one example, input of resizing the window to a third size is received to further resize the window; and a third pixel image of the window in the third size is buffered in the second window buffer. A portion of the frame buffer is then updated to the third pixel image to display the window in the third size.

In one example, when input of ending resizing the window is received, the second window buffer is resized according to the current size of the window. For example, the size of the second window buffer is reduced according to the final size of the window; alternatively, a new window buffer for the window of the current size is allocated.

In one example, the second window buffer is allocated in response to the input to start to resize the window; in another example, the second window buffer is allocated in response to a determination that the first window buffer is not large enough to buffer the window in the second size; in a further example, the second window buffer is allocated in response to a determination that the first window buffer is not large enough to buffer the window in the estimated size.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to optimize the performance of live resizing of buffered windows by using methods that avoid excessive buffer allocations.

When a live resizing 'session' starts (e.g., a mouse-down event on a grow box), a temporary buffer that is large enough for the session (e.g., one that is the size of the screen, or an educated guess on how big the window may become) is allocated. A clipping rectangle is used to display the part of the temporary buffer that is currently valid. The area within the clipping rectangle in the temporary buffer is used to buffer the window. In the subsequent resizing, the clipping rectangle is changed according to the changing size of the window so that the window can be buffered in the area of the temporary buffer specified by the corresponding clipping rectangle; and further buffer allocations are avoided. When the live resizing 'session' ends (e.g., a mouse-up event on the grow box), the temporary buffer is reduced to the final size.

Since a clipped area from the temporary buffer is used to display the window, an application only needs to redraw the area where changes occur when the window is changed from one size to the other. There is no need for redrawing or copying the data for the area that is not changed. The number of page-faults is reduced significantly because the buffer memory is reused when the window is changed from one size to another. If the window system is implemented with 3D graphics hardware, releasing and rebinding the texture that represents the window can also be avoided. Thus, a significant performance gain can be achieved using methods according to various embodiments of the present invention.

Figure 6:
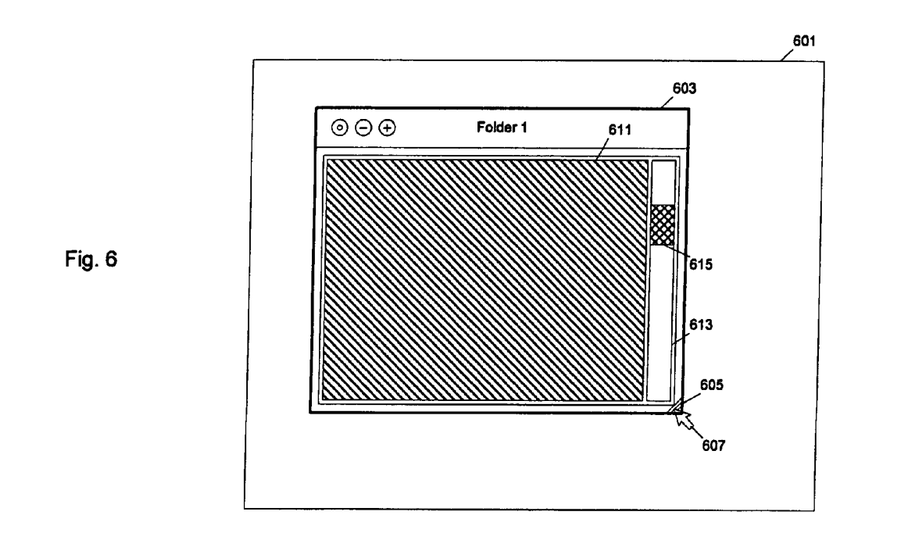
FIGS. 6-10 show scenarios of resizing a buffered window according to embodiments of the present invention.

FIGS. 6-10 show scenarios of resizing a buffered window according to embodiments of the present invention. In FIG. 6, window buffer 603 is shown on top of the portion of frame buffer 601 before a live resizing operation. When the user causes cursor 607 to drag grow box 605 (e.g., pressing and holding down a mouse button while the cursor is over the grow box and moving the mouse, or using keyboards, or through a command recognized by a voice recognition system, or other input devices to provide similar inputs), the user starts to resize the window. Similar to window 303 in FIG. 3, window 603 contains area 611 for displaying contents (e.g., list of folders or files in a folder) and scroll bar 613. The position and the size of thumb 615, with respect to the scroll bar, indicate the position and the size of the visible portion of the content in area 611 with respect to the entire content.

Figure 7:
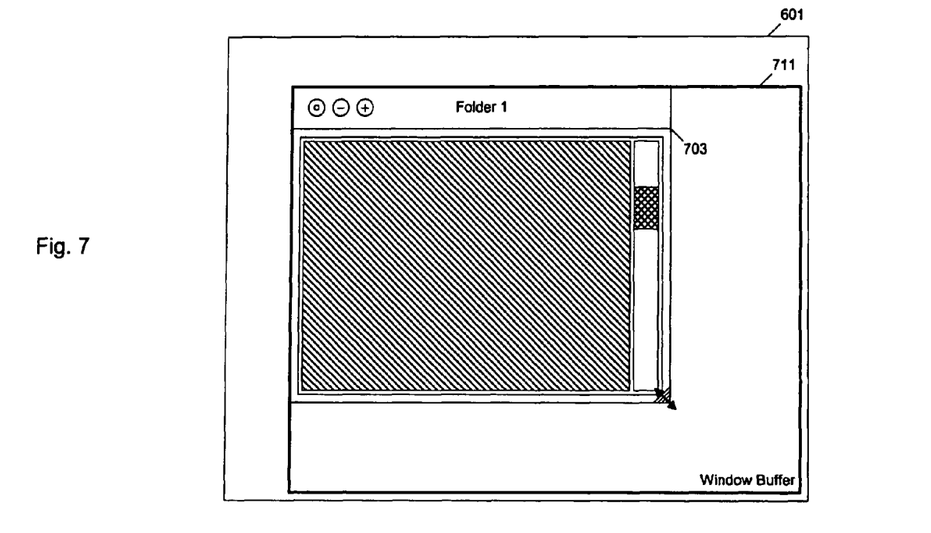

When the user starts to resize the window, an estimated size of the window is determined. In FIG. 7, it is determined that the largest window size that can reach in the current resizing operation is corresponding to dragging the grow box to the lower right corner of the screen. Thus, window buffer 711 is allocated for the window. The data in window buffer 603 is copied into window buffer 711; and then, window buffer 603 is freed. Clipping rectangle 703 indicates the currently valid data area for display. Thus, the window system copies the data within clipping rectangle 703 to update the frame buffer in order to display the window.

Figure 8:
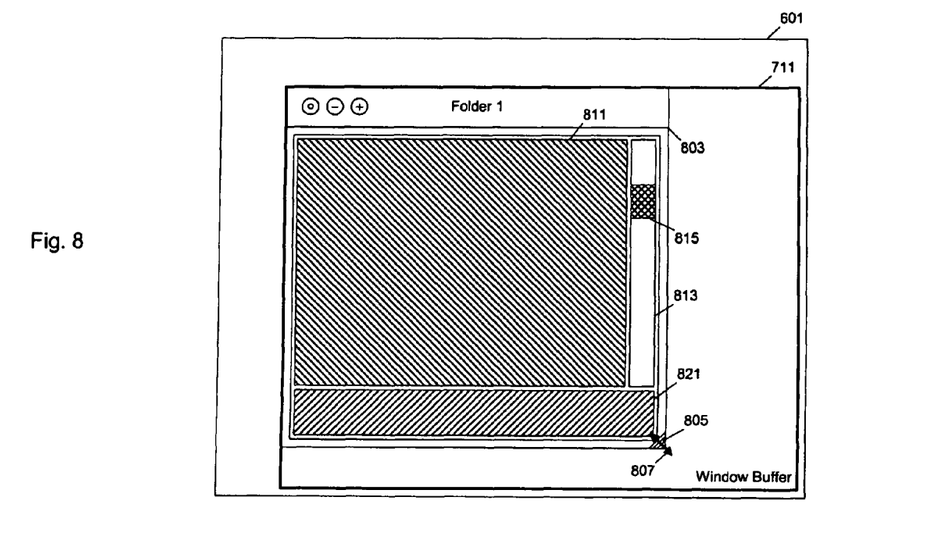

When the user drags grow box 805 to change the height of the window to that indicated by the position of cursor 807 in FIG. 8, clipping rectangle 803 is used to indicate the currently valid data area. Since the content of area 811 is not changed, the application does not have to update it. No copying operation is necessary. The application only needs to update area 821 and scroll bar area 813 to show additional contents in area 821 and to draw a new scroll bar to indicate the updated position and size of the visible area versus the entire content.

Figure 9:
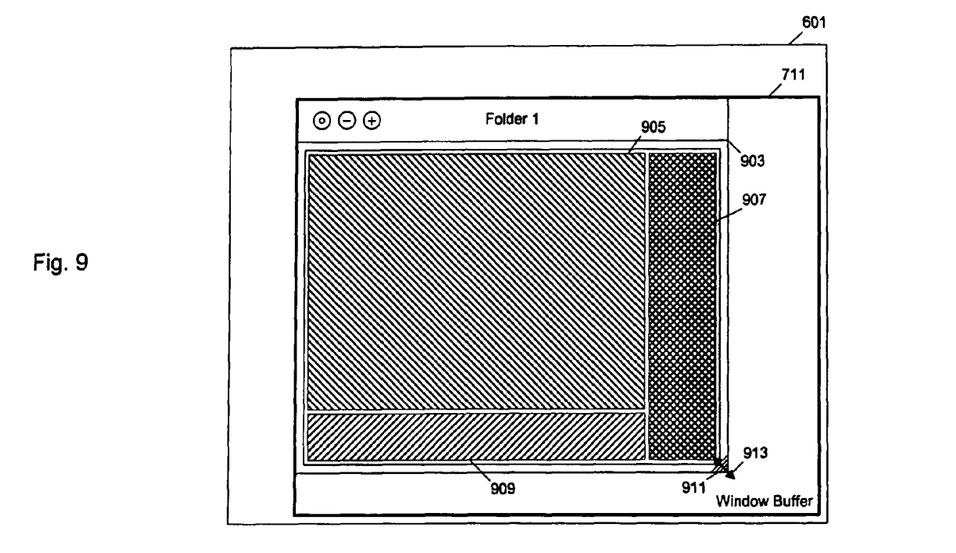

When the user drags grow box 911 to further change the width of the window to that indicated by the position of cursor 913 in FIG. 9, clipping rectangle 903 is used to indicate the currently valid data area. If areas 905 and 909 are not changed after changing the width, the application only needs to draw for area 907. The application updates only the area that is changed from the previous image of the window. Window buffer 711 is reused; allocation for a new window buffer is not performed; and there is no need to copy data from an old window buffer to a new window buffer.

Figure 10:
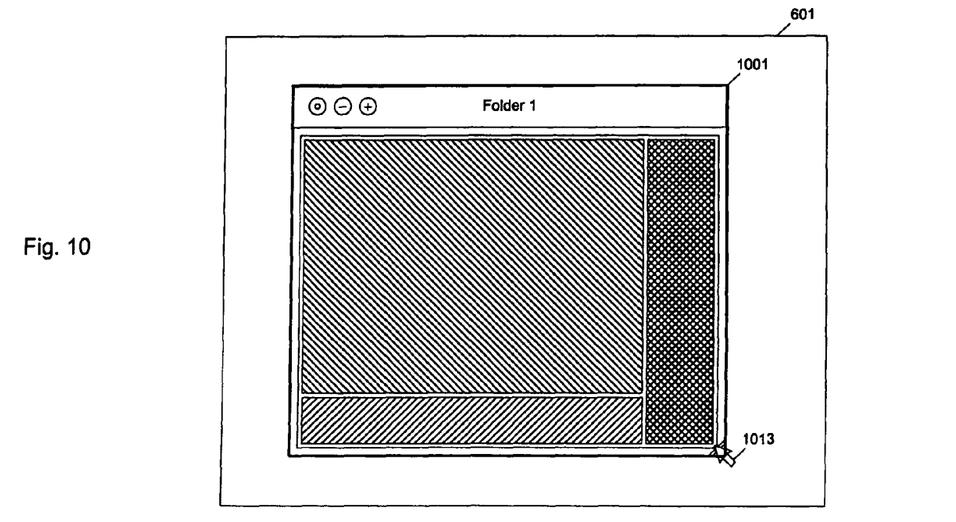

When the user releases grow box 913 (e.g., releasing the mouse button held down while dragging the grow box, or providing equivalent inputs from a keyboard or other input devices), the 'session' of live resizing ends; and the size of the window is finalized. In FIG. 10, the final size of the window is indicated by the position of cursor 1013, where the user releases the grow box to end resizing. Window buffer 711 is resized as window buffer 1011 according to the final size of the window. In one embodiment of the invention, the data in window buffer 711 is rearranged; and the extra memory is returned to the system. In another embodiment of the invention, a window buffer for the window of the final size is allocated; and data is copied from window buffer 711 to the new window buffer for the window of the final size.

Figure 11:
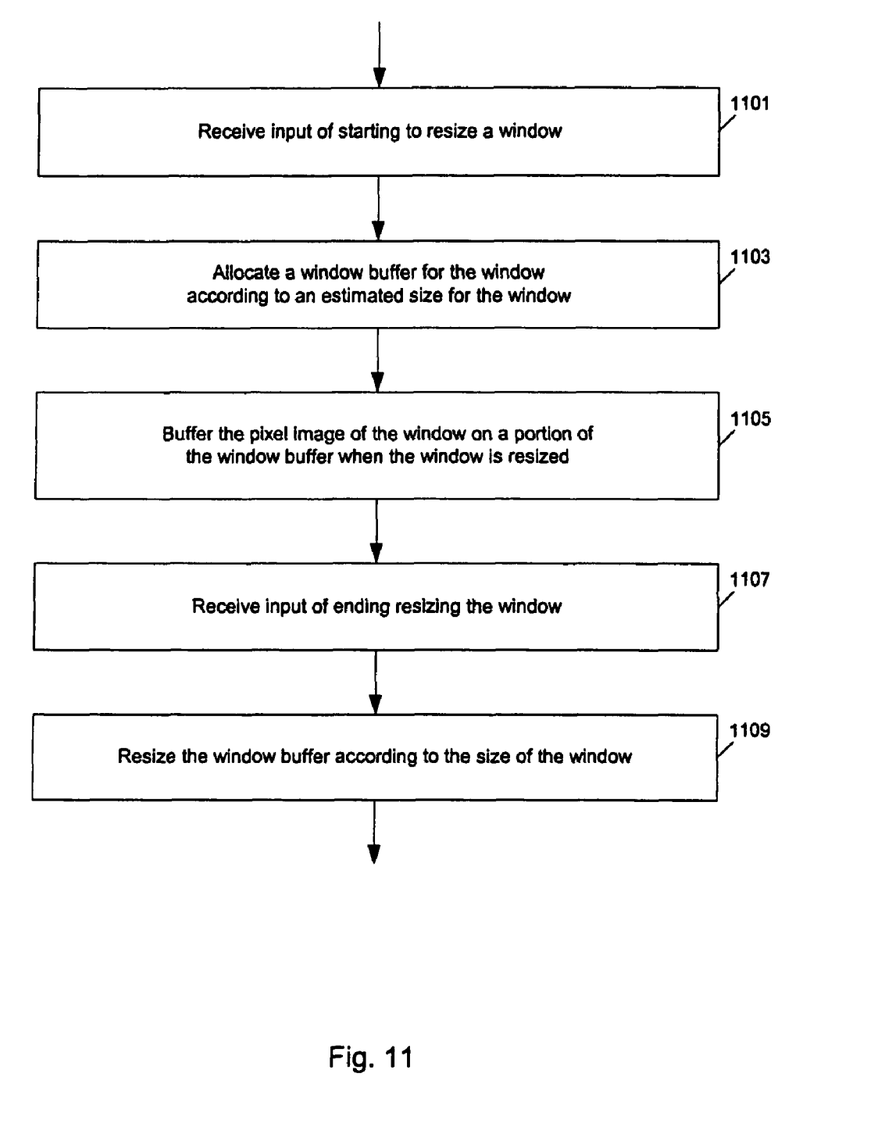
FIG. 11 shows a flow chart for a method to resize a buffered window according to one embodiment of the present invention.

FIG. 11 shows a flow chart for a method to resize a buffered window according to one embodiment of the present invention. After operation 1101 receives input to start to resize a window (e.g., pressing down a mouse button on a grow box or a portion of the border of the window, pressing a short-cut key, a command recognized by a voice recognition system, or others), operation 1103 allocates a window buffer for the window according to an estimated size for the window (e.g., the size of the entire screen, the maximum size that can be reach from the current position, or other estimations). The input to start to resize the window may be in response to a user instructing the data processing system to resize the window, or in response to an activity of the data processing system (e.g., a computer program instruction initiated by a machine intended to resize the window, such as a system call from a software program or hardware sensor), or in response to other events or inputs (e.g., predetermined conditions or criteria are met). The estimated size may be a predetermined size (e.g., a size based on a viewable area of a display device, such as the size of a screen that is attached to the data processing system), or computed from one or more parameters (e.g., the size of a screen, the current size of the window, a predetermined increment for changing size). Operation 1105 buffers the pixel image of the window in a portion of the window buffer when the window is resized. When the size of the window is continuously changed, the size of the clipped portion is changed accordingly without reallocating a new window buffer. The pixel image buffered in the clipped portion of the window buffer is used to update the corresponding image of the window in the frame buffer. The window may be resized in response to a request (e.g., input from a user input device, such as a mouse, a track ball, a touch pad, or a voice recognition system) to resize the window, or in response to a determination that the window is to be resized (e.g., when the window is live resized for animation). After operation 1107 receives input of ending resizing the window (e.g., releasing the mouse button held down during dragging, or pressing a short-cut key, or others), operation 1109 resizes the window buffer according to the current size of the window (e.g., returning extra memory to the system, or reallocating a window buffer of the current size).

Figure 12:
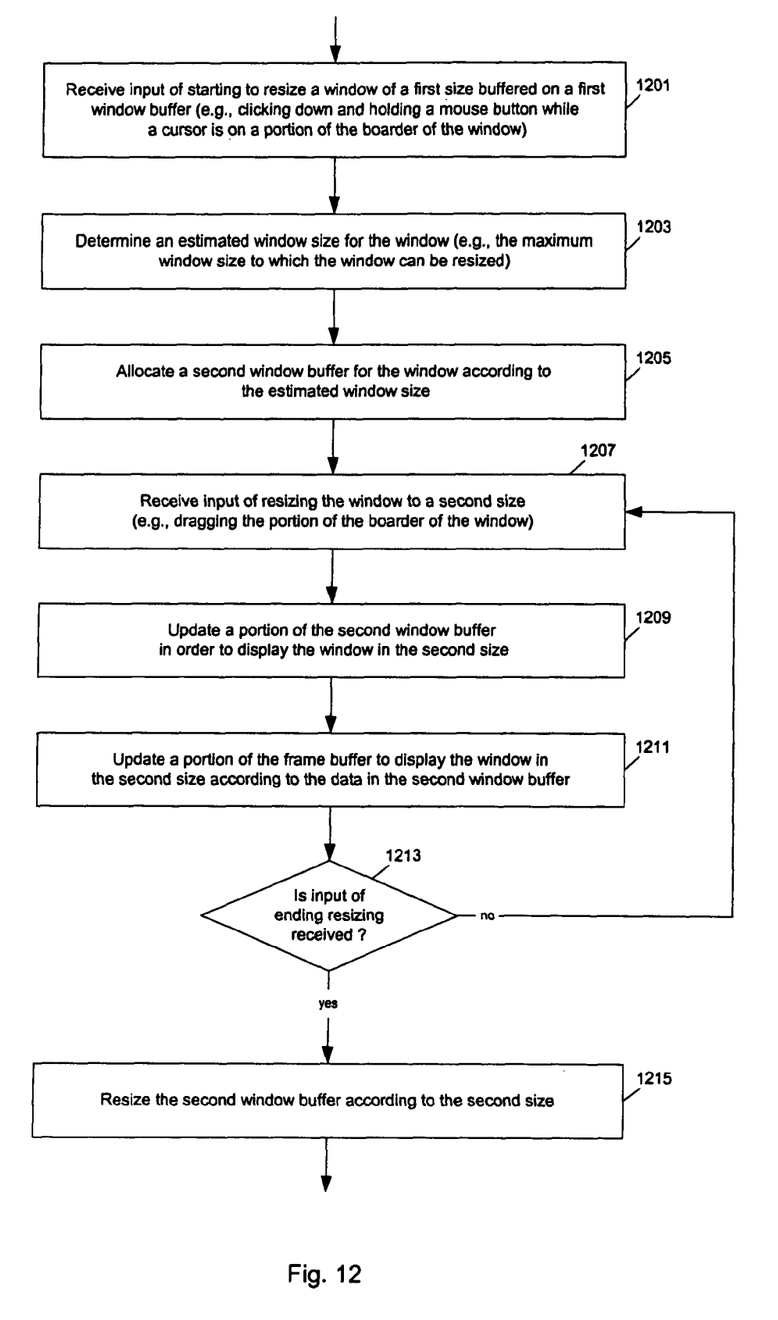
FIG. 12 shows a detailed flow chart for a method to resize a buffered window according to one embodiment of the present invention.

FIG. 12 shows a detailed flow chart for a method to resize a buffered window according to one embodiment of the present invention. After operation 1201 receives input to start to resize a window of a first size buffered in a first window buffer, operation 1203 determines an estimated window size for the window. Operation 1205 allocates a second window buffer for the window according to the estimated window size. After operation 1207 receives input of resizing the window to a second size, operation 1209 updates a portion of the second window buffer to update the image of the window in the second size. A portion of the frame buffer is updated to display the window in the second size according to the data in the second window buffer. If it is determined that input of ending resizing is received in operation 1231, operation 1215 resizes the second window buffer according to the second size (the current size of the window); otherwise, operation 1207-1213 is repeated for live resizing until input of ending resizing is received.

Although FIGS. 6 and 12 illustrate scenarios where a window buffer for an estimated size is allocated in response to input to start to resizing the window, it will be apparent to one skilled in the art from this description that allocating the temporary window buffer can be in response to other conditions after the user starts to resize the window. For example, the temporary window buffer can be allocated in response to a determination that the current window buffer is not large enough to buffer the window in the second size, or in response to a determination that the first window buffer is not large enough to buffer the window in an estimated size.

Figure 13:
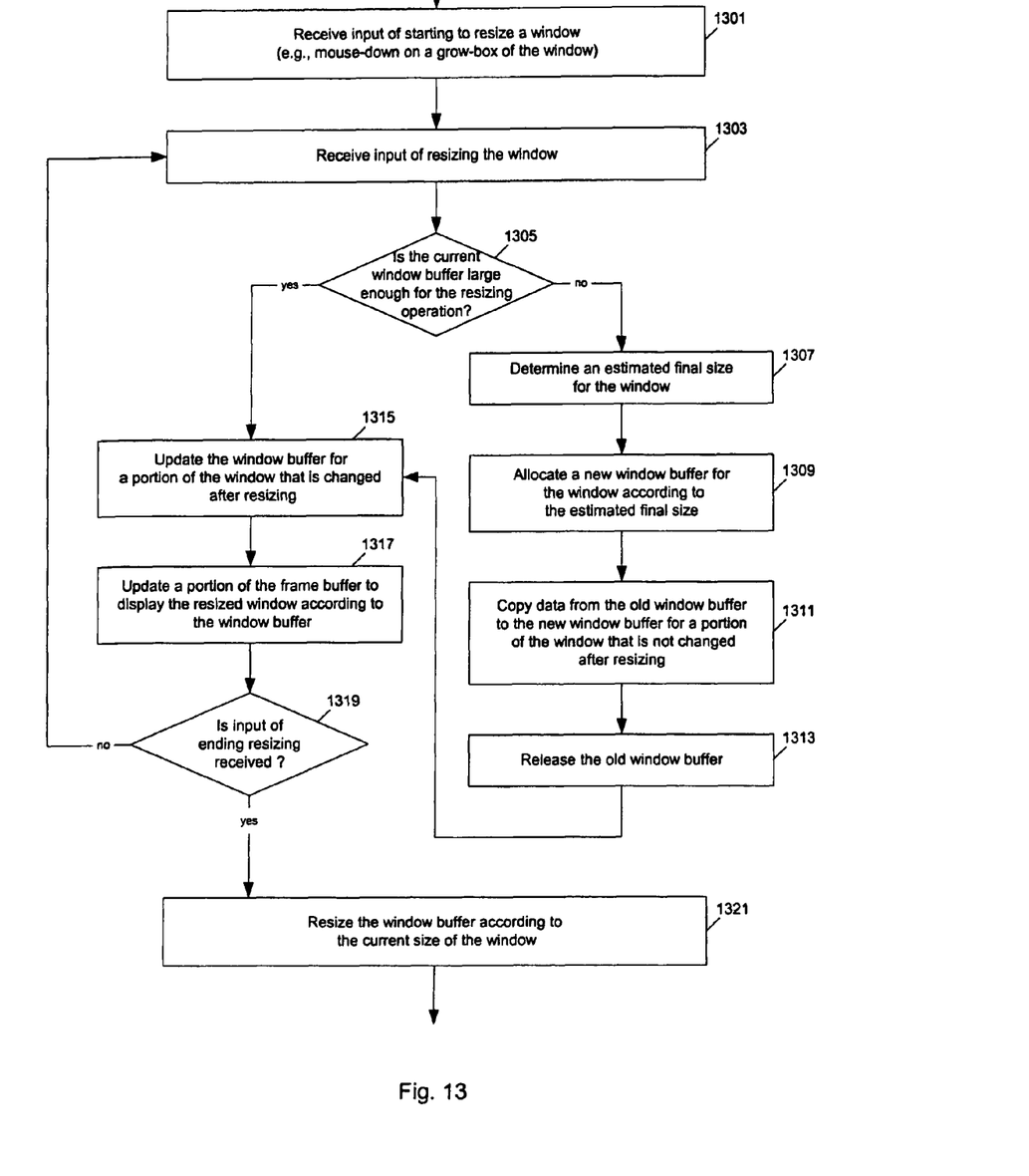
FIG. 13 shows a detailed flow chart for a method to resize a buffered window according to another embodiment of the present invention.

FIG. 13 shows a detailed flow chart for a method to resize a buffered window according to another embodiment of the present invention. After operation 1301 receives input to start to resize a window and operation 1303 receives input of resizing the window (e.g., the current size of the window is different from the previous size), operation 1305 is performed to determine whether or not the current window buffer is large enough for the resizing operation (e.g., whether or not the current window buffer is large enough for the resized window, or whether or not the current window buffer is likely large enough for continued resizing). If the current window buffer is large enough, operation 1315 updates the window buffer for a portion of the window that is changed after resizing; and operation 1317 updates a portion of the frame buffer to display the resized window according to the window buffer. If operation 1319 determines that input of ending resizing is received, operation 1321 is performed to resize the window buffer according to the current size of the window; otherwise, operation 1303 is performed to continue live resizing. If operation 1305 determines that the current window buffer is not large enough, operation 1307 determines an estimated final size for the window. Operation 1309 then allocates a new window buffer for the window according to the estimated final size. After operation 1311 copies data from the old window buffer to the new window buffer for a portion of the window that is not changed after resizing, the old window buffer is released (freed) in operation 1313; and operations 1315-1317 are performed to update the image of the window of the new size.

Figure 14:
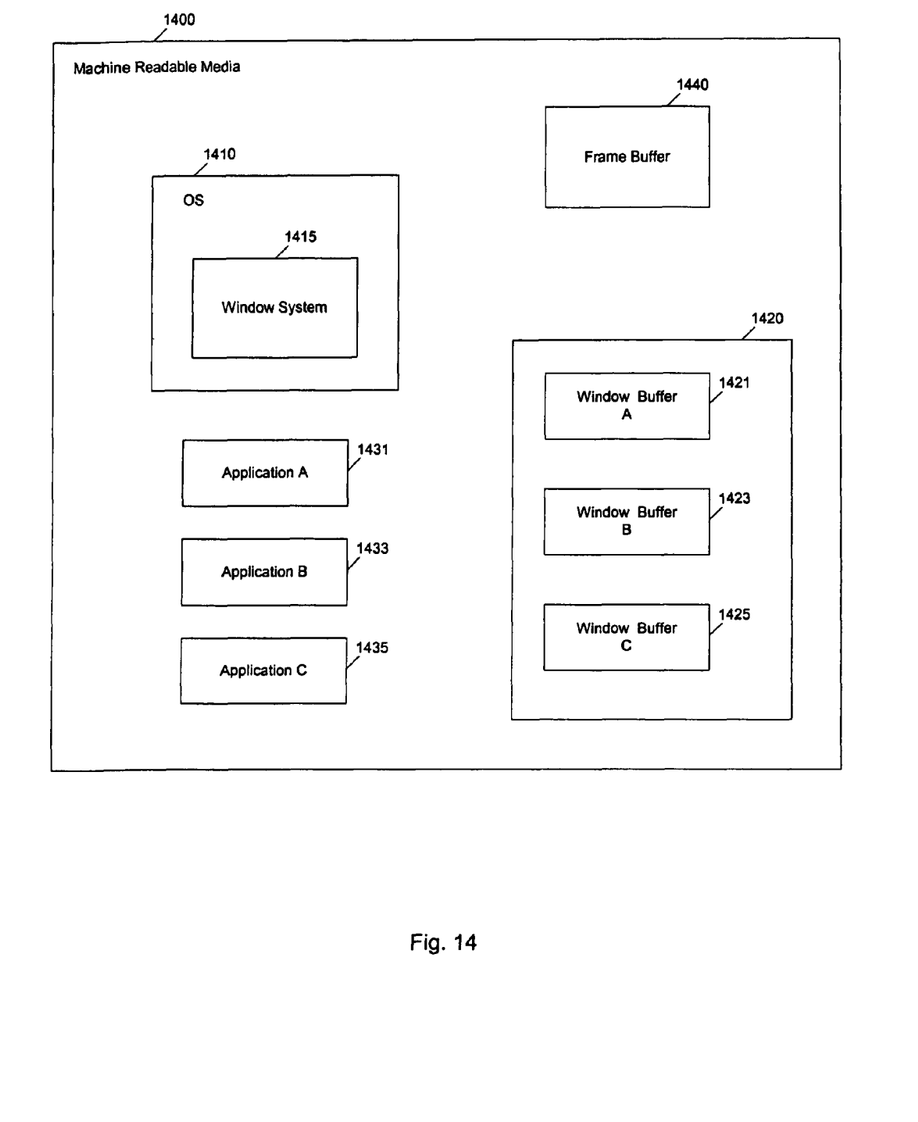
FIG. 14 shows an example of a machine readable media, which may be used to store software and data which when executed by a data processing system causes the system to perform various methods of the present invention.

FIG. 14 shows an example of a machine readable media, which may be used to store software and data which when executed by a data processing system causes the system to perform various methods of the present invention. As noted above, this executable software and data may be stored in various places including for example ROM 107, volatile RAM 105, non-volatile memory 106 and/or cache 104 as shown in FIG. 1. Portions of this software and/or data may be stored in any one of these storage devices. Media 1400 for example may be primarily volatile RAM 105 and non-volatile memory 106 in one embodiment. OS 1410 represents an operating system. Window system 1415 represents a window managing system, which is typically a part of OS 1410. Applications 1431-1435 represent application software, which display contents in corresponding windows on the system. Window buffers 1421-1425 represent the data for the pixel images of the windows drawn by applications 1431-1435 respectively. Applications 1431-1435 communicate with window system 1415 for allocating window buffers, drawing or updating contents in the window buffers, reallocating window buffers when the sizes of the windows are changed, allocating temporary window buffers of estimated sizes for live resizing using methods according to various embodiments of the present invention, etc. Frame buffer 1440 represents the data for the screen image to be displayed on a screen. Window system 1415 composes the data in frame buffer 1440 from window buffers 1420 according to the layout parameters (e.g., locations, hierarchy, and others) for the windows. Window buffers 1420 may be primarily on volatile RAM 105, or primarily on video memory (e.g., in display controller 108). Frame buffer may be primarily on video memory in display controller 108, or primarily on volatile RAM 105. Using the methods of various embodiments of the present invention, an application (e.g., 1431) communicates with window system 1415 to allocate a large enough temporary window buffer, draw in a clipped portion of the temporary window buffer (e.g., 1421) to update the pixel image of the window, and use the clipped portion of the window buffer to update the corresponding portion of the frame buffer during live resizing.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method to resize a window on a data processing system, the method comprising:

receiving an input, during a resizing operation, to resize a window displayed by a data processing system;

determining an estimated size to buffer the window during the resizing operation of the window, wherein the estimated size is larger than a current size for the window; and allocating a window buffer according to the estimated size for the window having the current size, wherein the window buffer allocated for the window continues to be used when the window changes from the current size to other sizes during the resizing operation.

2. The machine-implemented method of claim 1, wherein the receiving the input comprises receiving at least one cursor position controlled by a user during the resizing operation.

3. The machine-implemented method of claim 1, wherein the current size is associated with a position of a cursor on a screen.

4. The machine-implemented method of claim 1, wherein the estimated size includes an increment for changing the size of the window.

5. The machine-implemented of method claim 1, wherein the estimated size is determined based on one or more parameters comprising at least one of the size of a screen, the size of the window, and an increment for changing the size of the window.

6. The machine-implemented of method claim 1, further comprising
updating the window buffer for a portion of the window that is changed during the resizing operation.

7. The machine-implemented method of claim 1, wherein data in the window buffer for a portion of the window that is not changed during the resizing operation are kept unchanged.

8. A machine readable medium containing executable computer program instructions which when executed by a data processing system cause the data processing system to perform operations to resize a window on the data processing system, the operations, comprising:
receiving an input, during a resizing operation, to resize a window displayed by a data processing system;
determining an estimated size to buffer the window during the resizing operation of the window, wherein the estimated size is larger than a current size for the window; and
allocating a window buffer according to the estimated size for the window having the current size, wherein the window buffer allocated for the window continues to be used when the window changes from the current size to other sizes during the resizing operation.

9. The machine-readable medium of claim 8, wherein the receiving the input comprises receiving at least one cursor position controlled by a user during the resizing operation.

10. The machine-readable medium of claim 8, wherein the current size is associated with a position of a cursor on a screen.

11. The machine-readable medium of claim 8, wherein the estimated size includes an increment for changing the size of the window.

12. The machine-readable medium of claim 8, wherein the estimated size is determined based on one or more parameters comprising at least one of the size of a screen, the size of the window, and an increment for changing the size of the window.

13. The machine-readable medium of claim 8, wherein the machine-readable medium further includes data that causes the machine to perform operations comprising
updating the window buffer for a portion of the window that is changed during the resizing operation.

14. The machine-readable medium of claim 8, wherein data in the window buffer for a portion of the window that is not changed during the resizing operation are kept unchanged.

15. A data processing system to resize a window, comprising:
means for receiving an input, during a resizing operation, to resize a window displayed by a data processing system;
means for determining an estimated size to buffer the window during the resizing operation of the window, wherein the estimated size is larger than a current size for the window; and
means for allocating a window buffer according to the estimated size for the window having the current size, wherein the window buffer allocated for the window size continues to be used when the window changes from the current size to other sizes during the resizing operation.

16. The data processing system of claim 15, wherein the receiving the input comprises receiving at least one cursor position controlled by a user during the resizing operation.

17. The data processing system of claim 15, wherein the current size is associated with a position of a cursor on a screen.

18. The data processing system of claim 15, wherein the estimated size includes an increment for changing the size of the window.

19. The data processing system of claim 15, wherein the estimated size is determined based on one or more parameters comprising at least one of the size of a screen, the size of the window, and an increment for changing the size of the window.

20. The data processing system of claim 15, further comprising
means for updating the window buffer for a portion of the window that is changed during the resizing operation.

21. The data processing system of claim 15, wherein
data in the window buffer for a portion of the window that is not changed during the resizing operation are kept unchanged.

22. A data processing system to resize a window, comprising:
a bus;
a memory coupled to the bus;
a display coupled to the bus; and
a processor coupled to the bus, the processor configured to receive an input, during a resizing operation, to resize a window displayed by a data processing system, and is configured to determine an estimated size to buffer the window during the resizing operation of the window, wherein the estimated size is larger than a current size for the window, and the processor is configured to allocate a window buffer according to the estimated size for the window having the current size, wherein the window buffer allocated for the window continues to be used when the window changes from the current size to other sizes during the resizing operation.

23. The data processing system of claim 22, wherein the estimated size includes an increment for changing the size of the window.

24. The data processing system of claim 22, wherein the estimated size is determined based on one or more parameters comprising at least one of the size of a screen, the size of the window set by an application, and an increment for changing the size of the window.

25. The data processing system of claim 22, wherein the processor is further configured to update the window buffer for a portion of the window that is changed during the resizing operation.

* * * * *